United States Patent
DiFonzo et al.

(10) Patent No.: US 8,587,955 B2
(45) Date of Patent: Nov. 19, 2013

(54) ELECTRONIC DEVICE WITH A CERAMIC COMPONENT

(75) Inventors: John DiFonzo, San Mateo, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 943 days.

(21) Appl. No.: 11/752,854

(22) Filed: May 23, 2007

(65) Prior Publication Data
US 2008/0291620 A1   Nov. 27, 2008

(51) Int. Cl.
*H05K 1/18* (2006.01)

(52) U.S. Cl.
USPC ............ 361/761; 361/760; 361/686; 361/728

(58) Field of Classification Search
USPC .................. 361/761, 728, 760, 686
See application file for complete search history.

(56) References Cited

U.S. PATENT DOCUMENTS

| | | | |
|---|---|---|---|
| 4,746,557 A * | 5/1988 | Sakamoto et al. | 428/138 |
| 7,130,174 B2 * | 10/2006 | Miyai et al. | 361/100 |
| 7,195,381 B2 * | 3/2007 | Lynam et al. | 362/494 |
| 2005/0212773 A1 * | 9/2005 | Asbill | 345/173 |
| 2005/0219228 A1 * | 10/2005 | Alameh et al. | 345/173 |
| 2006/0173564 A1 * | 8/2006 | Beverly | 700/94 |
| 2006/0268528 A1 * | 11/2006 | Zadesky et al. | 361/728 |
| 2007/0065215 A1 * | 3/2007 | Brown | 400/490 |
| 2007/0218378 A1 * | 9/2007 | Drews et al. | 430/58.8 |
| 2008/0074329 A1 | 3/2008 | Caballero et al. | |
| 2008/0165071 A1 | 7/2008 | Chiang et al. | |
| 2008/0291617 A1 | 11/2008 | Ditonzo et al. | |
| 2009/0040129 A1 | 2/2009 | Degner et al. | |

OTHER PUBLICATIONS

U.S. Appl. No. 12/034,104, filed Feb. 20, 2008.

* cited by examiner

*Primary Examiner* — Timothy Thompson
*Assistant Examiner* — Andargie M Aychillhum
(74) *Attorney, Agent, or Firm* — Brownstein Hyatt Farber and Schreck, LLP

(57) ABSTRACT

An electronic device is disclosed. The electronic device may include a component made of a ceramic material. The electronic device may also include circuitry configured to transmit signals. The signals may pertain to input received through the component.

34 Claims, 7 Drawing Sheets

ELECTRONIC DEVICE WITH A CERAMIC COMPONENT

BACKGROUND OF THE INVENTION

Electronic devices, especially portable electronic devices, are typically required to have a sufficiently strong structure in order to ensure safety, reliability, and/or durability pertaining to the handling and use of the electronic devices, in addition to meeting functionality and/or performance requirements.

Further, size (or form factor) and weigh minimization also have become important requirements in designing and manufacturing electronic devices. Among other reasons, miniaturization and weigh reduction may provide significant advantages such as, for example, improved portability and/or reduced costs for storage, packaging, and/or transportation.

Moreover, aesthetic and tactile characteristics of electronic devices also have become more and more important. For example, buyers and users may expect surfaces (e.g., enclosure surfaces) of electronic devices to be scratch and dent resistant. Buyers and users may also expect electronic devices to look good and to have a comfortable, quality feel.

However, material properties, e.g., density, elasticity, yield strengths, thermal conductivity, electrical conductivity, etc., tend to cause various physical constraints in designing and manufacturing electronic devices and components. In the prior art, designers of electronic devices may have had difficulties designing electronic device components with the right materials to enable/help electronic devices to satisfy all the strength, weight, size, aesthetic/cosmetic, and tactile requirements and expectations with a generally affordable cost.

For example, materials typically utilized in user interface components of electronic devices may include plastics, such as polycarbonate, nylon, and ABS, which may be associated with lower cost, lighter weight, and a higher variety of visual characteristics (e.g., colors, patterns, etc.), compared with the cost, weight and appearance of a metal. However, a plastic component may need a relatively large dimension (e.g., thickness) to provide sufficient strength. Further, a plastic component may not be able to satisfactorily resist scratch.

Metals, such as steel, titanium, aluminum, and magnesium, also may be utilized in forming user interface components of electronic devices. Metals may provider higher strength and higher scratch resistance than plastics. However, metals may incur higher material and manufacturing costs. Metals may also significantly add weights to electronic devices. Light metals, such as titanium, aluminum, etc., may be utilized to minimize the weight problem. However, light metals may have a high cost and/or may need an undesirably large dimension to provide sufficient dent resistance and strength.

SUMMARY OF INVENTION

An embodiment of the present invention relates to an electronic device. The electronic device may include a component made of a ceramic material. The electronic device may also include circuitry configured to transmit signals. The signals may pertain to input received through the component.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
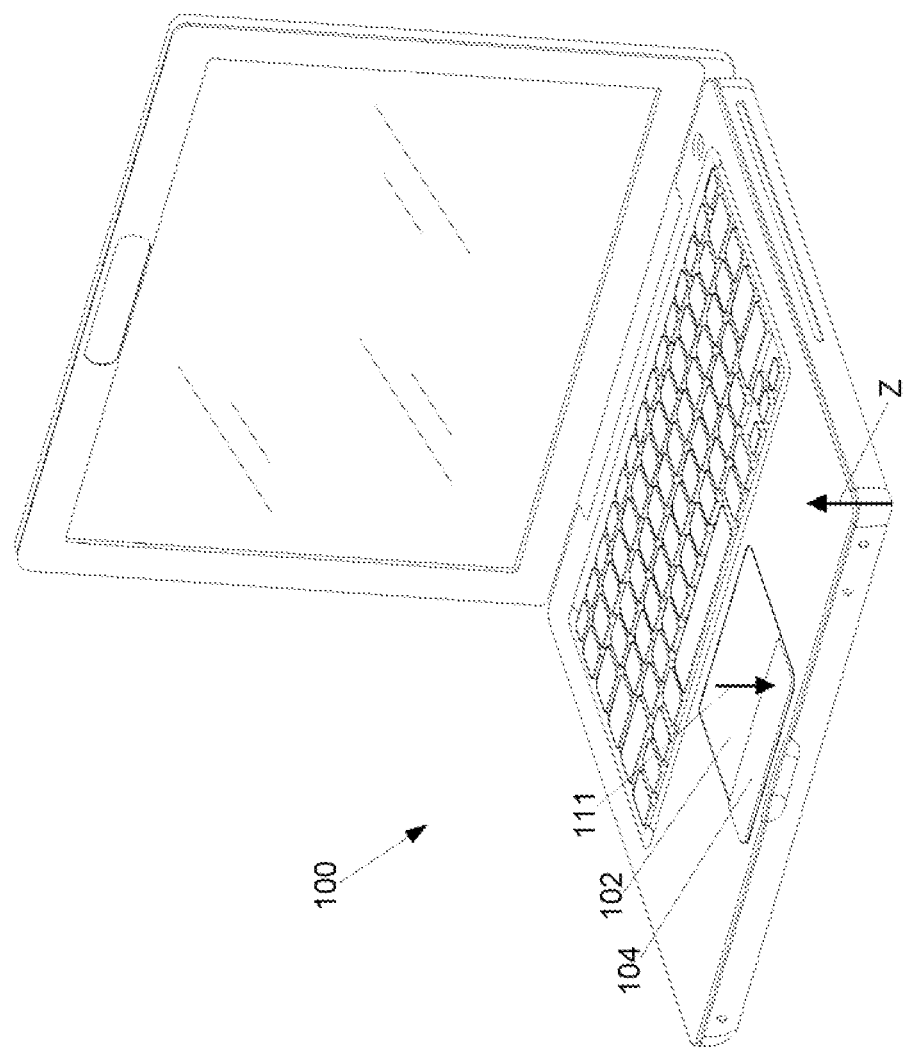
FIG. 1 illustrates an example prior-art electronic device that includes a pick button and a track pad.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the invention relate to an electronic device. For example, the electronic device may represent one or more of a computing device (e.g., a computer), a computer part (e.g., a disk drive), a communication device (e.g., a cellular phone), a media player (e.g., an MP3 player), etc.

The electronic device may include a component made of a ceramic material. The electronic device may also include circuitry configured to transmit signals, wherein the signals may pertain to input received through the component. The component may be configured to reinforce a structure of the electronic device. The ceramic material may include at feast one of zirconia and alumina.

In one or more embodiments, the component may represent a user interface component, and the input may represent user input. For example, the component may represent at least a portion of at least one of a button, a knob, a wheel, a switch, a slide, a power button, a pick button, an adjustment button, a key cap, a track pad, etc. In an example, the component may represent a track pad such that at least a portion of the track pad overlaps at least a portion of an enclosure of the electronic device, such that the structure of the electronic device is reinforced. In an example, the component may represent both of a pick button and a track pad. Alternatively or additionally, the component may represent an antenna window and may be configured to cover or enclose at least a portion of an antenna.

In one or more embodiments, the component may be configured to carry the circuitry. For example, the circuitry may be printed on and/or attached to the component. In one or more embodiments, the circuitry may represent at least part of a sensing device. For example, the circuitry may represent at least part of one or more capacitance sensors.

In one or more embodiments, the component may include one or more molded recess structures (e.g., a countersink) configured for accommodating at least a portion of one or more parts inside the electronic device and/or aligning/matching the component with one or more parts of the electronic device. In one or more embodiments, the component may include one or more molded protrusion structures configured for activating one or more switches of the electronic device and/or aligning/matching the component with one or more parts of the electronic device.

In one or more embodiments, at least a surface of the component may be anodized and/or colored through anodization.

In one or more embodiments, the component is translucent or transparent. The electronic device may further include an illuminating element configured to produce light. The light may be visible to a user of the electronic device through the component. Alternatively or additionally, one or more parts inside the electronic device may be visible through the component.

One or more embodiments of the invention relate to a user interface component configured for use in an electronic device. The user interface component may include a part that is made of a ceramic material. The ceramic material may include at least one of zirconia and alumina.

The features and advantages of the present invention may be better understood with reference to the figures and discussions (with prior art mechanisms and embodiments of the invention contrasted) that follow.

FIG. 1 (Prior Art) illustrates an example prior-art electronic device, such as notebook computer 100, which includes one or more user interface components, such as a pick button 104 and a track pad 102.

In general, pick button 104 may be configured to receive a force in a direction 111 in the Z dimension. A user of notebook computer 100 may click, press, and/or hold down pick button 104 in direction 111 to perform one or more functions of notebook computer 100, such as selecting an item or opening a menu. The user may click/press/hold down pick button 104 at various portions/points of the top surface of pick button 104 in different situations. Therefore, pick button 104 may be required to have sufficient stiffness, such that, no matter which portion/point of the top surface of pick button 104 the force is applied upon, pick button 104 may accurately transmitting the force to a switch inside notebook computer 100 to trigger the one or more functions.

Track pad 102 may be configured protect capacitance sensors thereunder. Typically, track pad 102 may need to be sufficiently thin, such that the capacitance sensors may be able to sense the capacitance of the user's finger that touches the top surface of track pad 102. Track pad 102 may also need to be electrically nonconductive so as not to interfere with operation of the capacitance sensors.

Since pick button 104 and track pad 102 are frequently touched by the user, both may need to have sufficient surface strength and to provide comfortable feel. Further, pick button 104 and track pad 102 typically constitute part of the exterior of notebook computer 100. Therefore, aesthetic/cosmetic considerations also may be important for both of pick button 104 and track pad 102.

Figure 2A:
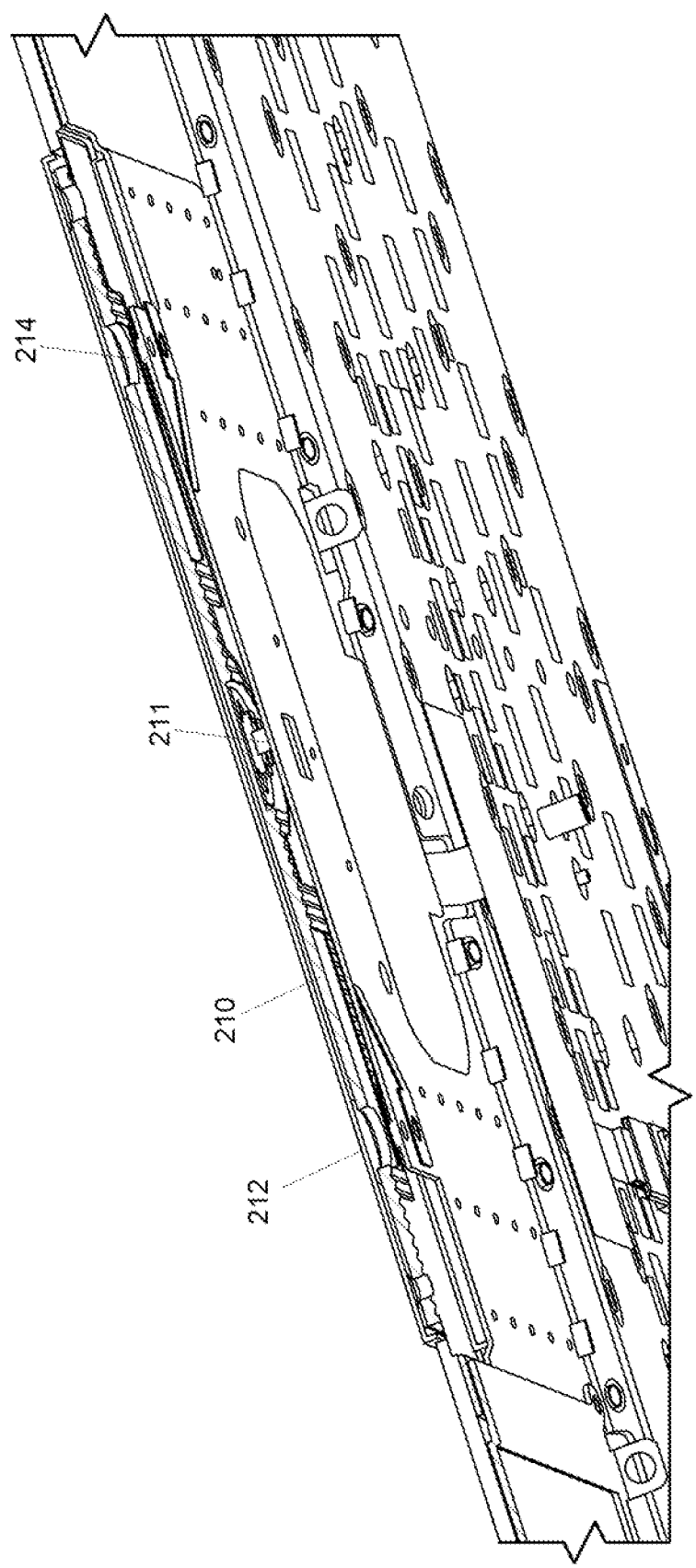
FIG. 2A illustrates a partial cross-sectional view of an example prior-art pick button mechanism.

FIG. 2A (Prior Art) illustrates a partial cross-sectional view of an example prior-art pick button mechanism. As illustrated in the example of FIG. 2A, the prior art pick button mechanism may include a steel piece 210 to provide a sufficient stiffness, such that a force input by a user may be accurately transmitted to switch 211, no matter which portion of steel piece 210 receives the force. Steel piece 210 may further include one or more machined features, such as machined feature 214, to accommodate one or more components, such as screw heads, inside the electronic device.

There may be at least several disadvantages associated with the steel piece 210. For example, the steel material of steel piece 210 may be heavy and may significantly increase the weight of an electronic device that includes steel piece 210.

Further, machined feature 214 may not be able to be formed through a die-casting process. Instead, machined feature 214 may be formed through a machining process, such as drilling. A machining process may usually be expensive. As a result, steel piece 210 may also significantly increase the manufacturing cost of the electronic device that includes steel piece 210.

In order to satisfy aesthetic and tactile requirements, the pick button mechanism may further include plastic cap 212 configured to cover steel piece 210. As a result, the structure of the pick button may include at least two layers, i.e., steel piece 210 and plastic cap 212. The multi-layer assembly may undesirably increase the thickness of the pick button mechanism. As a result, the miniaturization of the electronic device that includes the prior-art pick button mechanism may be limited. Further, the multi-layer assembly may also complicate the manufacturing process of the pick button mechanism. Disadvantageously, the manufacturing cost of the electronic device that includes the prior-art pick button mechanism may be further increased.

Figure 2B:
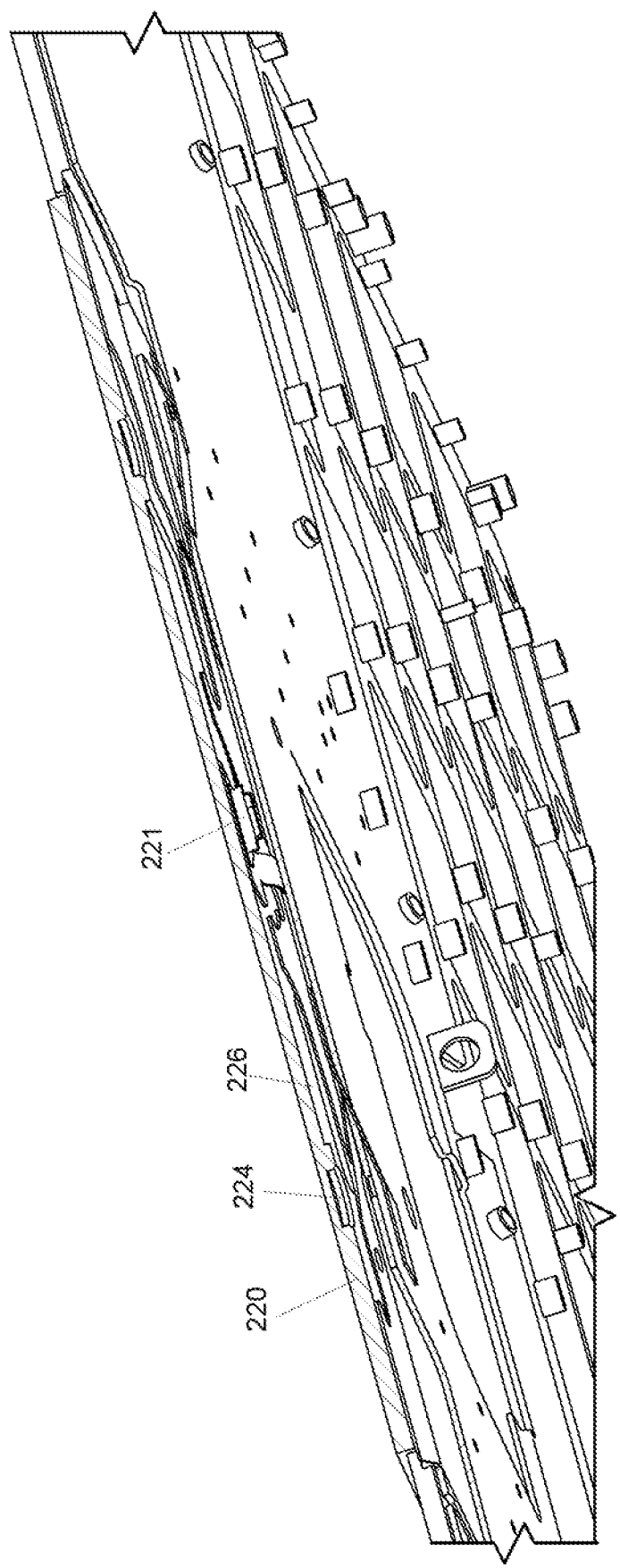
FIG. 2B illustrates a partial cross-sectional view of a pick button mechanism in accordance with one or more embodiments of the present invention.

FIG. 2B illustrates a partial cross-sectional view of a pick button mechanism in accordance with one or more embodiments of the present invention. The pick button mechanism may include a single-piece ceramic component 220, in contrast with a multi-layer assembly with the prior-art steel piece 210 and plastic cap 212 illustrated in the example of FIG. 2A (Prior Art).

Ceramic component 220 may be made of a ceramic material, for example, including alumina or zirconia. Accordingly, ceramic component 220 may provide sufficient strength and stiffness, such that a force applied by a user on any portion of ceramic component 220 may be accurately transmitted to switch 221 to trigger various functions of an electronic device that includes the pick button mechanism.

Ceramic component 220 may also include one or more die-cast features, such as a recess 224 (or countersink 224), to accommodate one or more components, such as screw heads, inside the electronic device. In or more embodiments, ceramic component 220 may also include other three-dimensional die-cast features protruding from a bottom surface 226 of ceramic component 220 for triggering/pressing one or more switches and/or matching one or more components inside the electronic device.

Ceramic component 220 may be manufactured employing an inject-molding process, which may be relatively inexpensive compared with the machining process employed in manufacturing the prior-art steel piece 210 illustrated in the example of FIG. 2A (Prior Art). Advantageously, an electronic device in accordance with one or more embodiments of the present invention may have a reduced manufacturing cost.

Compared with the prior-art steel piece 210, ceramic component 220 may have a lower density. Therefore, an electronic device in accordance with one or more embodiments of the present invention may have a reduced weight.

Further, ceramic component 220 may have a top surface that provides a comfortable feel to the user. The top surface may be provided, e.g., through employing one or more well-known ceramic manufacturing/processing/coloring processes, an aesthetically/cosmetically desirable appearance with no need for an additional cosmetic layer, in contrast with the requirement of plastic cap 212 illustrated in the example of FIG. 2A (Prior Art). For example, an anodization process may be employed to generate one or more designed colors.

Advantageously, in one or more embodiments of the invention, the thickness of the pick button mechanism may be minimized, the manufacturing of the electronic device that includes the pick button mechanism may be simplified, the part count and manufacturing cost of the electronic device may be further reduced, and aesthetic/cosmetic and tactile requirements of the electronic device may be satisfied.

In one or more embodiments, capacitance sensors and related electronic circuitry may be printed on (and/or attached to) the bottom surface 226 of ceramic component 220. Accordingly, ceramic component 220 may also perform functions of a track pad, in addition to functions of a pick button component. Instead of a stand-alone pick button and a stand-alone track pad, such as the prior-art pick button 104 and the prior-art track pad 102 illustrated in the example of FIG. 1, one or more embodiments of the invention may include an integrated track-pick button. As a result, the part count and manufacturing cost of an electronic device may be further reduced.

Figure 3A:
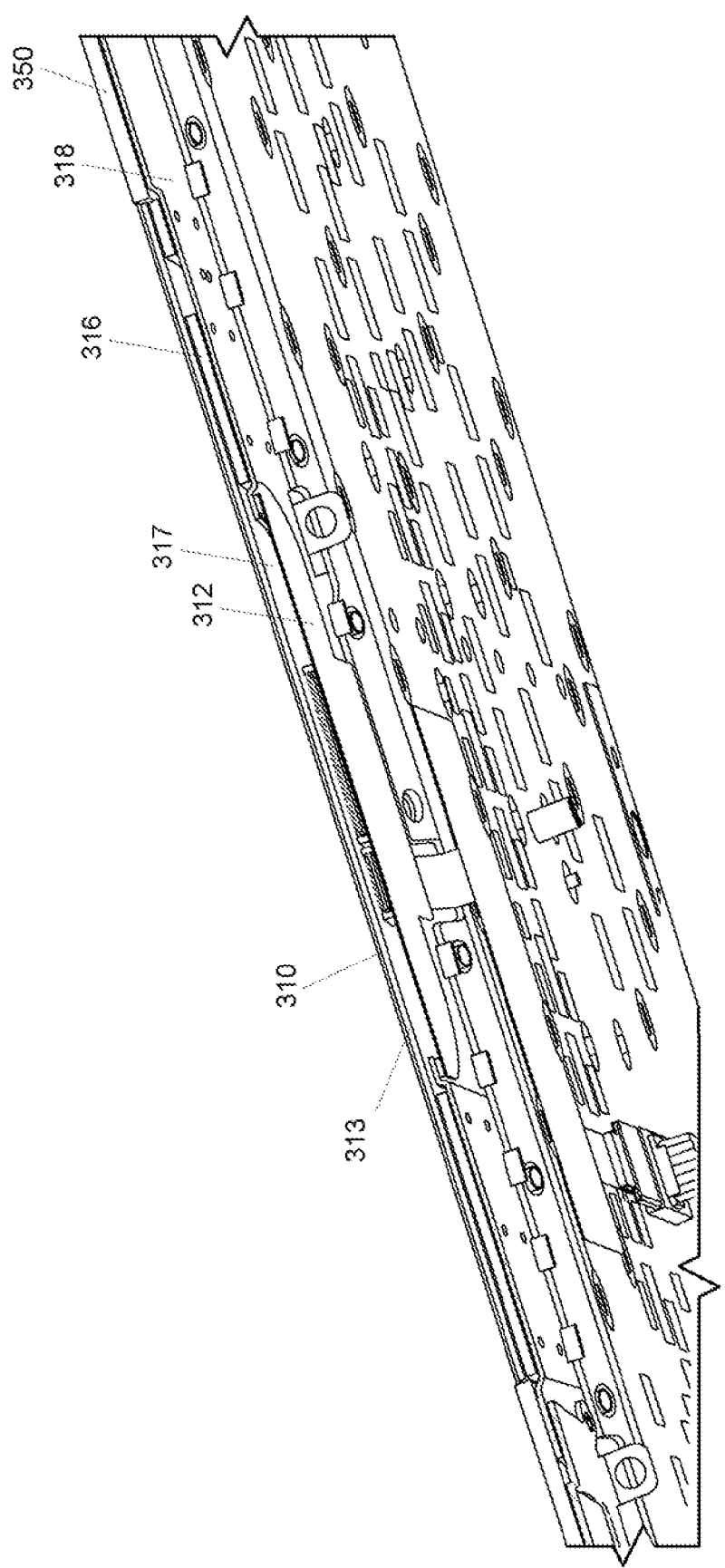
FIG. 3A illustrates a partial cross-sectional view of an example prior-art track pad mechanism.

FIG. 3A (Prior Art) illustrates a partial cross-sectional view of an example prior-art track pad mechanism. The track pad mechanism may include a plastic label 310. The track pad mechanism may also include one or more capacitance sensors, such as capacitance sensor 313, installed under plastic label 310. The capacitance of a user's finger that touches the top surface of plastic label 310 may be sensed by capacitance sensor 313 and transmitted to circuitry on flex circuit board 312. The sensed capacitance may be converted to signals that are transmitted to and processed by a processing unit in an electronic device that includes the track pad mechanism.

Plastic label 310 may be manufactured through a rolling process, such that the thickness of plastic label may be minimized to enable sensing of capacitance sensor 313. Since plastic label 310 is required to be electrically nonconductive, plastic label 310 may be made of a plastic material, such as polycarbonate plastic. However, given the minimized thickness of the plastic material, plastic label 310 may not be able to provide sufficient strength and stiffness to sufficiently withstand/support the movement and the touch of the user's finger(s).

To provide sufficient strength and stiffness, supporting elements such as shim 316 may be installed under capacitance sensor 313. Shim 316 also may be made of a plastic material that is electrically nonconductive. As a result, a significant thickness of shim 316 may be required to sufficiently provide the support. Under shim 316, steel recess plate 318, which may be thin, stiff, but electrically conductive, may be employed to support shim 316, thereby indirectly supporting capacitance sensor 313 and plastic label 310. Steel recess plate 318 may also provide structural support to top case 350 of the electronic device.

As illustrated in the example of FIG. 3A (Prior Art), the thickness of shim 316, as well as a space 317 between capacitance sensor 313 and circuit board 312, may increase the height of the track pad mechanism. Disadvantageously, the miniaturization of the electronic device that includes the prior-art track pad mechanism may be limited. Further, the requirements/arrangement of flex circuit board 312, shim 316, steel recess plate 318, etc. may also complicate the manufacturing process of the track pad mechanism. Disadvantageously, the manufacturing cost of the electronic device that includes the prior-art track pad mechanism may be further increased.

Figure 3B:
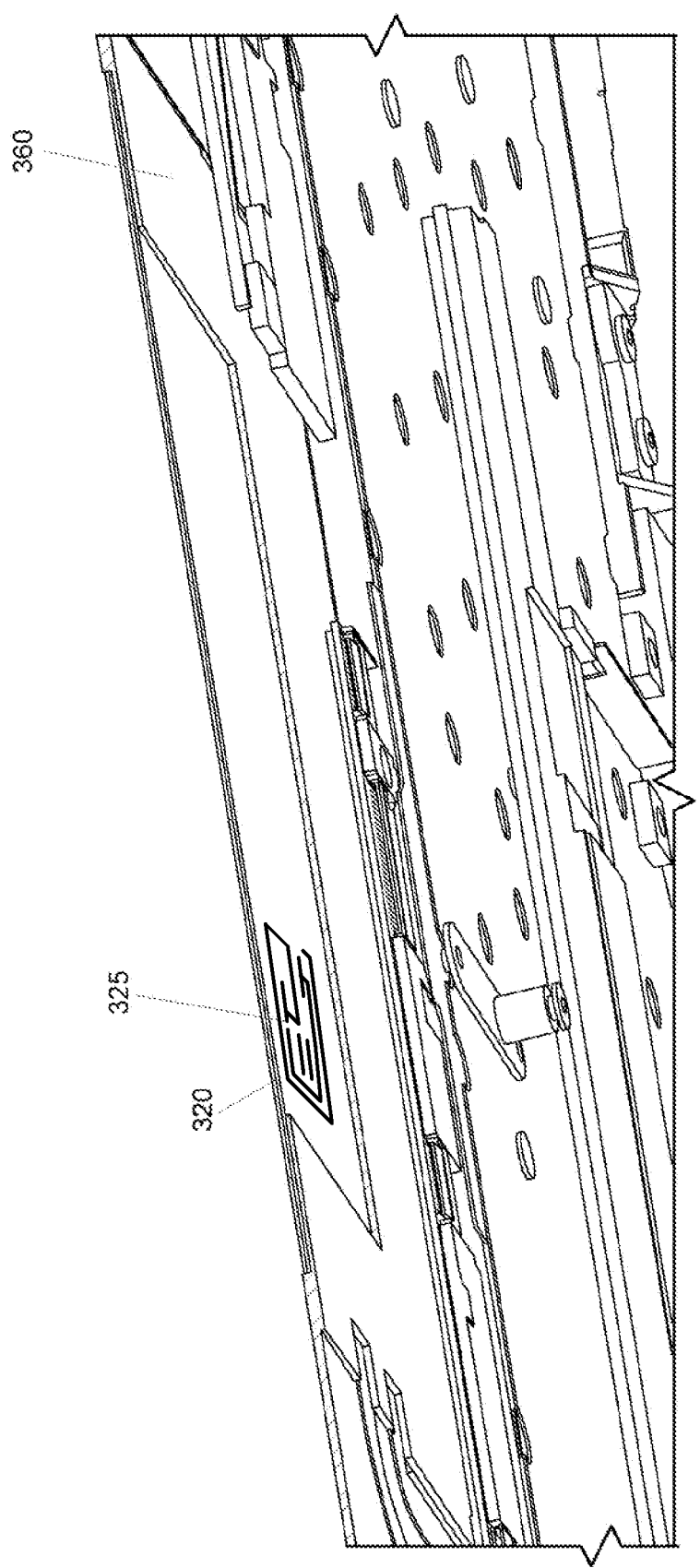
FIG. 3B illustrates a partial cross-sectional view of a track pad mechanism in accordance with one or more embodiments of the present invention.

FIG. 3B illustrates a partial cross-sectional view of a track pad mechanism in accordance with one or more embodiments of the present invention. The touch pad mechanism may include a ceramic track pad 320. The track pad mechanism may further include one or more capacitance sensors-circuitry 325 attached to and/or printed on a bottom surface of ceramic track pad 320. Accordingly, there may be no need for a circuit board, in contrast with the requirement of the prior-art flex circuit board 312 illustrated in the example of FIG. 3A (Prior Art).

Ceramic track pad 320 may be made of a ceramic material (e.g., alumina or zirconia) that is stiff and electrically nonconductive. As a result, there may be no need for an additional supporting member, in contrast with the requirements of the prior-art shim 316 and the prior-art steel recess plate 318 illustrated in the example of FIG. 3A (Prior Art). Further, ceramic track pad 320 may have a top surface that provides a comfortable feel to the user. The top surface may be provided, e.g., through employing one or more well-known ceramic manufacturing processes, an aesthetically/cosmetically desirable appearance with no need for any additional layer, in contrast with the requirement of the prior-art plastic label 310 illustrated in the example of FIG. 3A (Prior Art).

Advantageously, in one or more embodiments of the invention, the thickness of the track pad mechanism may be minimized, the part count of an electronic device may be reduced, the manufacturing of the electronic device may be simplified, and the manufacturing cost of the electronic device may be reduced.

As further illustrated in the example of FIG. 3B, at least a portion of ceramic track pad 320 may match and/or overlap at least a portion of a top case 360 of the electronic device that includes ceramic track pad 320. Advantageously, the structure of top case 360 may be reinforced by track pad 320, the structure of top case 360 may be simplified, and the cost and weight of top case 360 may be reduced.

In one or more embodiments, ceramic track pad 320 may be manufactured employing an inject-molding process to include one or more three-dimensional features to accommodate and/or match one or more other components of the electronic device that includes ceramic track pad 320.

Figure 4A:
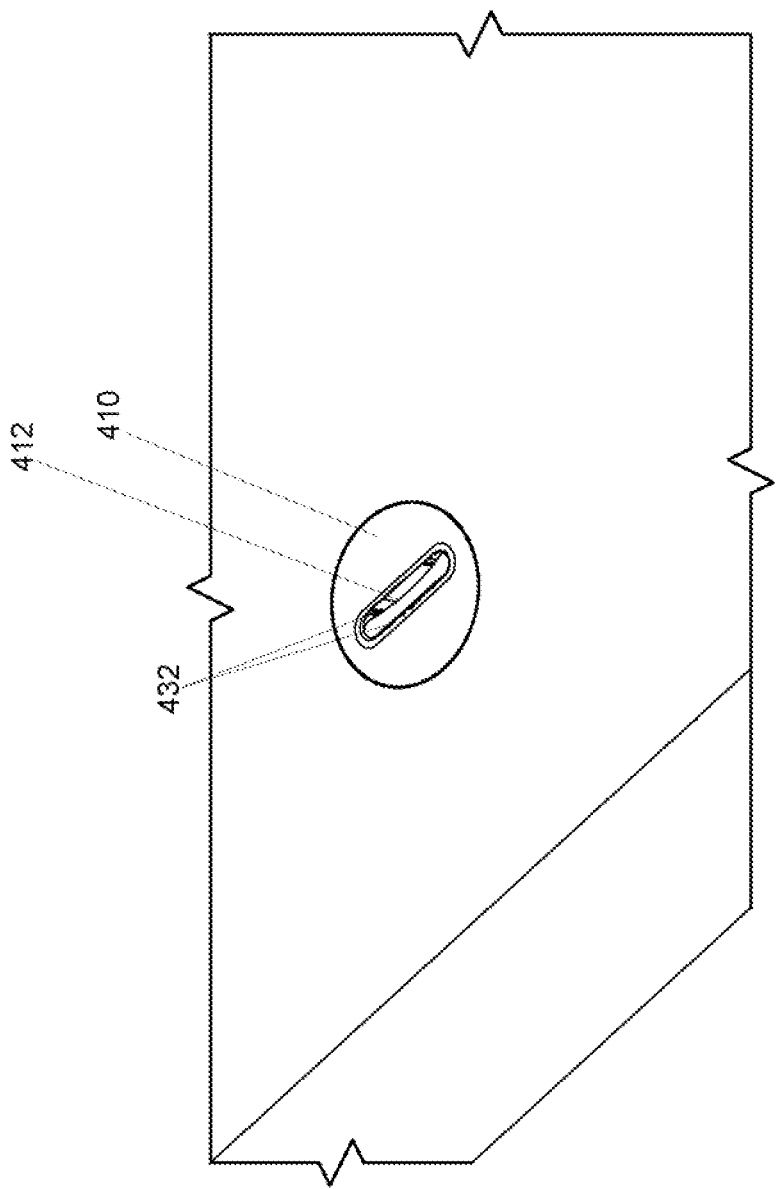
FIG. 4A illustrates an example prior-art coin turn.

FIG. 4A (Prior Art) illustrates an example prior-art coin turn 410. Coin turn 410 may be employed to trigger between securing and releasing a part, such as a battery, of an electronic device, such as a notebook computer. As illustrated in the example of FIG. 4A (Prior Art), coin turn 410 may include a slot 412 for receiving a force/torque provided by a coin. Coin turn 410 may be made of a plastic material, and slot 412 may represent a molded feature of coin turn 410. Since the plastic material may be weak relative to the coin, there may easily be damage 432 to slot 412. Damage 432 may significantly change the shape of slot 412. As a result, the performance of coin turn 410 may deteriorate, and the user of the coin turn may experience significant inconvenience when the part is to be secured or released.

Alternatively, coin turn 410 may be made of a metal material, such as steel, to provide a sufficient strength. However, the manufacturing of slot 412 may require a machining process, which may be expensive and may significantly increase the manufacturing cost of the electronic device.

Figure 4B:
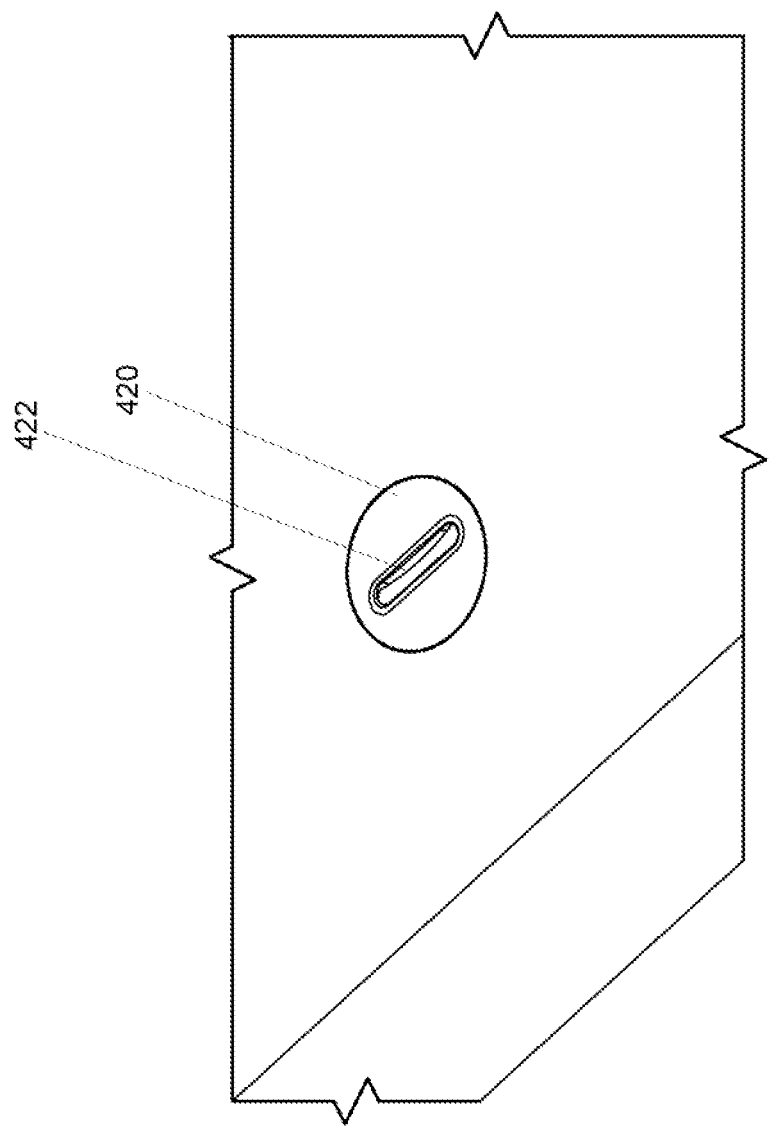
FIG. 4B illustrates a ceramic coin turn in accordance with one or more embodiments of the present invention.

FIG. 4B illustrates a ceramic coin turn 420 in accordance with one or more embodiments of the present invention. Ceramic coin turn 420 may be made of a ceramic material, such as alumina or zirconia, utilizing a molding/die-casting manufacturing process. Slot 422 of ceramic coin turn 420 may represent a die-casting feature. The molding/die-casting manufacturing process may be significantly less expensive than the machining process utilized in fabricating metal components and features. The ceramic material of ceramic coin turn 420 may provide sufficient strength to withstand the pressure of coins which are utilized to exert a force/torque on slot 422. Accordingly, slot 422 may have no significant damage, in contrast with damage 432 to the prior-art slot 412 illustrated in the example of FIG. 4A (Prior Art). Advantageously, ceramic coin turn 420 may have better performance and durability than prior art coin turns.

One or more embodiments of the invention may include a different ceramic user interface component, such as one or more of a button, a knob, a wheel, a switch, a slide, a power button, an adjustment button, a key cap, etc.

In one or more embodiments, a ceramic component may be utilized to cover or enclose at least a portion of an antenna. The ceramic component may be transparent to RF signals without interfering with the operation of the antenna. At the same time, the stiffness and strength of the ceramic component may provide sufficient protection to the antenna. The ceramic component may be manufactured to have one or more aesthetic/cosmetic features (e.g., color, pattern, etc.) that match one or more exterior parts of an electronic device.

In one or more embodiments, a ceramic component may be transparent or translucent. An electronic device including the ceramic component may also include an illuminating device for generating a light that is visible to a user through the ceramic component. Alternatively or additionally, the electronic device may also include one or more parts inside the electronic device and visible through the ceramic component.

As can be appreciated from the foregoing, embodiments of the invention may provide strength, durability, feel, scratch resistance, etc. comparable or superior to the benefits provided by metal materials. At the same time, embodiments of the invention may provide low cost, light weight, molding/die-casting manufacturability, electrical non-conductivity, transparency to RF signals, transparency/translucency to light, aesthetic/cosmetic and tactile features and flexibility, etc. comparable or superior to benefits provided by plastic materials. Advantageously, embodiments of the present invention may simultaneously satisfy strength, weight, size, cost, aesthetic/cosmetic, and tactile requirements and expectations in manufacturing electronic devices.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alternations, permutations, and equivalents as fall within the true spirit and scope of the present invention.

What is claimed is:

1. An electronic device comprising:
   a single-piece ceramic user interface component,
   wherein the user interface component includes printed circuitry on a surface of the user interface component,
   wherein the circuitry is configured to transmit signals from the user interface component to another component of the electronic device,
   wherein the signals pertain to user input received by the user interface component; and
   the user interface component includes a three-dimensional protrusion structure protruding from its bottom surface and configured for at least one of activating a switch of the electronic device and aligning the user interface component with one or more parts of the electronic device.

2. The electronic device of claim 1 wherein the user interface component represents at least a portion of at least one of a button, a knob, a wheel, a switch, a slide, a power button, a pick button, an adjustment button, a key cap, and a track pad.

3. The electronic device of claim 1 wherein the circuitry represents at least part of a sensing device.

4. The electronic device of claim 1 wherein the circuitry represents at least part of one or more capacitance sensors.

5. The electronic device of claim 1 wherein at least a surface of the user interface component is anodized.

6. The electronic device of claim 1 wherein at least a surface of the user interface component is colored through anodization.

7. The electronic device of claim 1 wherein the user interface component includes a recess structure configured for at least one of accommodating at least a portion of a part inside the electronic device and aligning the user interface component with one or more parts of the electronic device.

8. The electronic device of claim 1 wherein the user interface component is configured to reinforce a structure of the electronic device.

9. The electronic device of claim 1 wherein the user interface component represents both of a pick button and a track pad, the component carries the circuitry, and the circuitry is at least part of a sensing device.

10. The electronic device of claim 1 wherein the user interface component represents a track pad, at least a portion of the track pad overlapping at least a portion of an enclosure of the electronic device.

11. The electronic device of claim 1 wherein the user interface component is translucent or transparent.

12. The electronic device of claim 1 further comprising an illuminating element configured to produce light, the light being visible to a user of the electronic device through the user interface component.

13. The electronic device of claim 1 wherein the single-piece ceramic component includes at least one of zirconia and alumina.

14. The electronic device of claim 1, wherein the protrusion is formed by die-casting or molding.

15. A user interface component configured for use in an electronic device, the user interface component comprising a first part that is made of a single-piece ceramic component that is translucent or transparent to allow light to transmit therethrough, wherein a surface of the first part has printed circuitry, and wherein the first part includes a three-dimensional protrusion structure projecting from its bottom surface, a recess structure configured for at least one of accommodating at least a portion of a part of the electronic device and aligning the user interface component with one or more parts of the electronic device and the protrusion structure configured for at least one of activating a switch of the electronic device and aligning the user interface component with one or more parts of the electronic device.

16. The user interface component of claim 15, wherein the first part represents at least a portion of at least one of a button, a knob, a wheel, a switch, a slide, a power button, a pick button, an adjustment button, a key cap, and a track pad.

17. The user interface component of claim 15 wherein the circuitry represents at least part of a sensing device.

18. The user interface component of claim 15 wherein the circuitry represents at least part of one or more capacitance sensors.

19. The user interface component of claim 15 wherein at least a surface of the first part is anodized.

20. The user interface component of claim 15 wherein at least a surface of the first part is colored through anodization.

21. The user interface component of claim 15 wherein the first part is configured to reinforce a structure of the electronic device.

22. The user interface component of claim 15 representing both of a pick button and a track pad, wherein the first part carries circuitry that is at least part of a sensing device.

23. The user interface component of claim 15 representing a track pad, wherein at least a portion of the first part overlaps at least a portion of an enclosure of the electronic device.

24. The user interface component of claim 15 wherein the single-piece ceramic component includes at least one of zirconia and alumina.

25. The user interface component of claim 15, wherein the electronic device comprises an illuminating element configured to produce light, the light being visible to a user of the electronic device through the user interface component.

26. The user interface component of claim 15, wherein the protrusion is formed by die-casting or molding.

27. An electronic device comprising:
a single-piece ceramic user interface component, wherein the user interface component includes a three-dimensional, protrusion projecting from its bottom surface, and wherein the user interface component further includes printed circuitry on a surface of the user interface component, wherein the circuitry is configured to transmit signals from the user interface component to another component of the electronic device, wherein the signals pertain to user input received by the user interface component.

28. The electronic device of claim 27, wherein the protrusion structure is configured for at least one of activating a switch of the electronic device and aligning the user interface component with one or more parts of the electronic device.

29. The electronic device of claim 27, wherein the user interface component includes a recess structure configured for at least one of accommodating at least a portion of a part of the electronic device and aligning the user interface component with one or more parts of the electronic device.

30. The electronic device of claim 27, wherein the single-piece ceramic user interface component is configured to reinforce a structure of the electronic device.

31. The electronic device of claim 27, wherein the user interface component represents at least a portion of at least one of a button, a knob, a wheel, a switch, a slide, a power button, a pick button, an adjustment button, a key cap, and a track pad.

32. The electronic device of claim 22, wherein the user interface component is translucent or transparent.

33. The electronic device of claim 32, further comprising an illuminating element configured to produce light, the light being visible to a user of the electronic device through the user interface component.

34. The electronic device of claim 27, wherein the protrusion is formed by die-casting or molding.

* * * * *